(12) United States Patent
Hegyi (10) Patent No.: US 10,175,116 B1
(45) Date of Patent: Jan. 8, 2019

(54) COLOR FILTER USED WITH LIQUID-CRYSTAL POLARIZATION INTERFEROMETER

(71) Applicant: Palo Alto Research Center Incorporated, Palo Alto, CA (US)

(72) Inventor: Alex Hegyi, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 15/858,354

(22) Filed: Dec. 29, 2017

(51) Int. Cl.
| | |
|---|---|
| *G01J 3/02* | (2006.01) |
| *G01J 9/02* | (2006.01) |
| *G02F 1/139* | (2006.01) |
| *G01J 3/51* | (2006.01) |
| *G02F 1/1335* | (2006.01) |

(52) U.S. Cl.
CPC . *G01J 9/02* (2013.01); *G01J 3/51* (2013.01); *G02F 1/1393* (2013.01); *G02F 1/133528* (2013.01); *G01J 2009/0261* (2013.01)

(58) Field of Classification Search
CPC ... G01J 3/02; G01J 3/0224; G01J 3/45; G01B 9/02049
See application file for complete search history.

(56) References Cited

U.S. PATENT DOCUMENTS

| | | |
|---|---|---|
| 4,342,516 A | 8/1982 | Chamran et al. |
| 4,812,657 A | 3/1989 | Minekane |
| 4,848,877 A | 7/1989 | Miller |
| 4,905,169 A | 2/1990 | Buican et al. |
| 5,247,378 A | 9/1993 | Miller |
| 5,347,382 A | 9/1994 | Rumbaugh |
| 5,619,266 A | 4/1997 | Tornita et al. |
| 5,642,214 A * | 6/1997 | Ishii ............... G02F 1/13473 349/117 |
| 5,784,162 A | 7/1998 | Cabib et al. |
| 5,856,842 A | 1/1999 | Tedesco |
| 5,953,083 A | 9/1999 | Sharp |
| 6,169,564 B1 | 1/2001 | Aye et al. |
| 6,421,131 B1 | 7/2002 | Miller |
| 6,552,836 B2 | 4/2003 | Miller |

(Continued)

OTHER PUBLICATIONS

U.S. Appl. No. 15/827,204, filed Nov. 30, 2017.

(Continued)

*Primary Examiner* — Jonathan Hansen
(74) *Attorney, Agent, or Firm* — Hollingsworth Davis, LLC (57) ABSTRACT

An apparatus includes a liquid-crystal polarization interferometer that causes an optical path delay between a first and a second polarization of input light. The liquid-crystal polarization interferometer includes a liquid-crystal variable retarder that provides a variable retardance in response to a voltage applied across the liquid-crystal cell. First and second polarizers are located on opposing sides of the liquid-crystal cell. The apparatus includes an image sensor that senses interferograms based on output light that passes through the liquid-crystal polarization interferometer. The apparatus includes a color filter that filters one of the input light and the output light. The color filter has a spectral transmission characteristic that passes more light in a blue spectral region that in a red spectral region.

20 Claims, 8 Drawing Sheets

(56) References Cited

U.S. PATENT DOCUMENTS

| | | |
|---|---|---|
| 6,576,886 B1 | 7/2003 | Yao |
| 6,774,977 B1 | 8/2004 | Walton et al. |
| 7,067,795 B1 | 6/2006 | Yan et al. |
| 7,116,370 B1 | 10/2006 | Huang |
| 8,422,119 B1 | 4/2013 | Keaton |
| 9,631,973 B2 | 4/2017 | Dorschner |
| 2004/0036876 A1 | 2/2004 | Davis et al. |
| 2004/0165101 A1 | 8/2004 | Miyanari et al. |
| 2005/0190329 A1 | 9/2005 | Okumura |
| 2006/0141466 A1* | 6/2006 | Pinet .................. G01N 21/23 435/6.11 |
| 2006/0187974 A1 | 8/2006 | Dantus |
| 2006/0279732 A1 | 12/2006 | Wang |
| 2007/0003263 A1 | 1/2007 | Nomura |
| 2007/0070354 A1 | 3/2007 | Chao et al. |
| 2008/0158550 A1 | 7/2008 | Arieli et al. |
| 2008/0212874 A1 | 9/2008 | Steib |
| 2008/0278593 A1 | 11/2008 | Cho et al. |
| 2009/0284708 A1 | 11/2009 | Abdulhalim |
| 2010/0056928 A1 | 3/2010 | Zuzak |
| 2011/0170098 A1 | 7/2011 | Normand |
| 2011/0273558 A1 | 11/2011 | Subbiah et al. |
| 2011/0279744 A1 | 11/2011 | Voigt |
| 2011/0299089 A1 | 12/2011 | Wang et al. |
| 2012/0013722 A1 | 1/2012 | Wong et al. |
| 2012/0013922 A1 | 1/2012 | Wong et al. |
| 2012/0268745 A1 | 10/2012 | Kudenov |
| 2012/0300143 A1 | 11/2012 | Voigt |
| 2013/0010017 A1 | 1/2013 | Kobayashi et al. |
| 2013/0027516 A1 | 1/2013 | Hart |
| 2013/0107260 A1 | 5/2013 | Nozawa |
| 2014/0125990 A1 | 5/2014 | Hinderling et al. |
| 2014/0257113 A1 | 9/2014 | Panasyuk et al. |
| 2014/0354868 A1 | 12/2014 | Desmarais |
| 2014/0362331 A1 | 12/2014 | Shi |
| 2015/0168210 A1 | 6/2015 | Dorschner |
| 2015/0206912 A1 | 7/2015 | Kanamori |
| 2016/0123811 A1* | 5/2016 | Hegyi .................. G01J 3/0256 348/33 |
| 2016/0127660 A1 | 5/2016 | Hegyi et al. |
| 2016/0127661 A1 | 5/2016 | Hegyi et al. |
| 2017/0264834 A1 | 9/2017 | Hegyi et al. |
| 2017/0264835 A1 | 9/2017 | Hegyi et al. |

OTHER PUBLICATIONS

U.S. Appl. No. 15/858,338, filed Dec. 29, 2017.
U.S. Appl. No. 15/858,368, filed Dec. 29, 2017.
U.S. Appl. No. 15/858,609, filed Dec. 29, 2017.
File History for U.S. Appl. No. 14/527,347 as retrieved from the U.S. Patent and Trademark Office.
File History for U.S. Appl. No. 14/527,378 as retrieved from the U.S. Patent and Trademark Office.
File History for U.S. Appl. No. 14/883,404 as retrieved from the U.S. Patent and Trademark Office.
Hegyi et al., "Hyperspectral imaging with a liquid crystal polarization interferometer", Optics Express, vol. 23, No. 22, 13 pages, Oct. 26, 2015.
Itoh et al., "Liquid-crystal imaging Fourier-spectrometer array", Optics Letters, 15:11, 652-652, Jun. 1, 1990.
Jullien et al., "High-resolution hyperspectral imaging with cascaded liquid crystal cells", Optica, Vo. 4, No. 4, pp. 400-405, Apr. 2017.
Li et al., "GPU accelerated parallel FFT processing for Fourier transform hyperspectral imaging", Applied Optics, vol. 54, No. 13, pp. D91-D99, May 1, 2015.
Persons et al., "Automated registration of polarimetric imagery using Fourier transform techniques", Proceedings of SPIE, vol. 4819, 2002.
Porter et al., "Correction of Phase Errors in Fourier Spectroscopy", International Journal of Infrared and Millimeter Waves, vol. 4, No. 2, 273-298, 1983.
Smith et al., "Increased acceptance bandwidths in optical frequency conversion by use of multiple walk-off-compensating nonlinear crystals". J. Opt. Soc. Am. B/ vol. 15, No. 1, Jan. 1998.

* cited by examiner

COLOR FILTER USED WITH LIQUID-CRYSTAL POLARIZATION INTERFEROMETER

SUMMARY

The present disclosure is directed to a color filter used with a liquid-crystal polarization interferometer. In one embodiment, an apparatus includes a liquid-crystal polarization interferometer that causes an optical path delay between a first and a second polarization of input light. The liquid-crystal polarization interferometer includes a liquid-crystal variable retarder that provides a variable retardance in response to a voltage applied across the liquid-crystal cell. First and second polarizers are located on opposing sides of the liquid-crystal cell. The apparatus includes an image sensor that senses interferograms based on output light that passes through the liquid-crystal polarization interferometer. The apparatus includes a color filter that filters one of the input light and the output light. The color filter has a spectral transmission characteristic that passes more light in a blue spectral region that in a red spectral region.

In another embodiment, a method involves causing an optical path delay between a first and a second polarization of input light via a liquid-crystal polarization interferometer. The liquid-crystal polarization interferometer includes a liquid-crystal variable retarder that provides a variable retardance in response to a voltage applied across a liquid-crystal cell, and further includes first and second polarizers on opposing sides of the liquid-crystal cell. One of the input light and output light that passes through the liquid-crystal polarization interferometer is filtered such that proportionally more light is passed in a blue spectral region than in a red spectral region. Interferograms are formed based on the output light.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

DETAILED DESCRIPTION

The present disclosure relates to hyperspectral imaging devices. Hyperspectral imaging devices described herein use a polarization interferometer that is configured to introduce a variable optical path delay in components of light that pass through the interferometer. The device that causes the path delay (referred to as a variable optical retarder) is placed between two polarizers such that the variable path delay is introduced between first rays in an incident polarization direction and second rays in an orthogonal polarization (e.g., ordinary and extraordinary rays). This path delay causes a wavelength-dependent phase shift between the first and second rays. The path delay causes light exiting the polarization interferometer to form common-path interferograms that are detected via an optical sensor, e.g., a focal-plane array.

A polarization interferometer can use one or more liquid-crystal (LC) cells as a variable optical retarder. Such a device is referred to herein as a liquid-crystal variable retarder (LCVR). Generally, liquid-crystal (LC) materials are liquids having some crystalline properties (e.g., orientation of internal structures, such as the LC director that indicates the local average alignment of LC molecules) that can be selectably altered by applying an external stimulus, such as an electric field or a magnetic field. A change in orientation of the LC director alters the optical properties of the LC materials, e.g., changing the optical axis of the LC birefringence.

An LCVR generates a variable optical path delay (also referred to as a variable retardance) between two orthogonal polarizations of light that travel through the liquid crystal. One or more liquid-crystal cells within the LCVR function as electrically tunable birefringent elements. By varying the voltage across the electrodes of the liquid-crystal cell, the cell molecules change their orientation, and it is possible to controllably change the optical path delay over a period time.

To create a polarization interferometer with an LCVR, the LCVR is placed between a first polarizer and a second polarizer with nominally parallel or perpendicular polarization axes. The slow axis of the LCVR (the polarization axis with the variable optical path delay) is oriented nominally 45 degrees with respect to the polarization direction of the first polarizer. Incoming light is polarized to an incident polarization direction by the first polarizer. Because the slow axis of the LCVR is at 45 degrees with respect to this incident polarization direction, the polarized incident light can be described in terms of a portion of light polarized parallel to the slow axis of the LCVR and a portion of light polarized perpendicular to this axis.

As the light passes through the LCVR, it acquires a wavelength-dependent relative phase shift between the first and second polarizations, thereby leading to a wavelength-dependent change in the polarization state. The second polarizer, or analyzer, oriented either parallel or perpendicular to the first polarizer, interferes the portion of light polarized parallel to the slow axis of the LCVR with the portion of light polarized perpendicular, changing the wavelength-dependent polarization state at the output of the LCVR into a wavelength-dependent intensity pattern that can be sensed by an optical detector or a focal plane array. By sensing this intensity while varying the retardance of the LCVR, it is possible to measure an interferogram of the incoming light, which can be used to ascertain spectral properties of the incoming light.

An noted above, an LCVR is used in hyperspectral imaging applications because of its abilities to encode spectral information of the incident light into an intensity pattern that is easily measured with a non-spectrally-resolving detector. Hyperspectral imaging refers to methods and devices for acquiring hyperspectral datasets or data-cubes, which may include images where densely sampled, finely resolved spectral information is provided at each pixel.

One issue seen with some hyperspectral imaging devices is decreased sensitivity in the blue with respect to sensitivity in the red. This difference in sensitivity degrades the dynamic range of these hyperspectral imaging devices across their detectable range of the optical spectrum. When performing Fourier-transform hyperspectral imaging, e.g., using an LCVR polarization interferometer, there are multiple factors that all contribute to decreased sensitivity at shorter wavelengths (e.g., 400-500 nm and below, or a blue spectral region) with respect to longer wavelengths (e.g., 500-600 nm and above, or a red spectral region). These factors will be explained in more detail below.

This lack of sensitivity at shorter wavelengths can be problematic due to the time- and wavelength-multiplexed image acquisition of such systems, meaning that at any given time, light from across the hyperspectral imager's spectral range is detected at the image sensor. Shot noise from each wavelength is distributed across the full reconstructed spectrum. Thus, if a spectrum to be sensed has equal energy per unit wavelength, but the hyperspectral imager has poor short wavelength sensitivity, the short wavelength signals will be obscured by shot noise generated at longer wavelengths.

In addition, the spectral reconstruction of such systems is not perfect and there is generally some degree of spectral leakage. For example, a monochromatic light source in the red will have sidebands in the reconstructed spectrum that show up in the blue. If the sideband suppression is on the order of (or less than) the relative sensitivity between the red and the blue, the red light source will severely distort any genuine signal in the blue.

Figure 1:
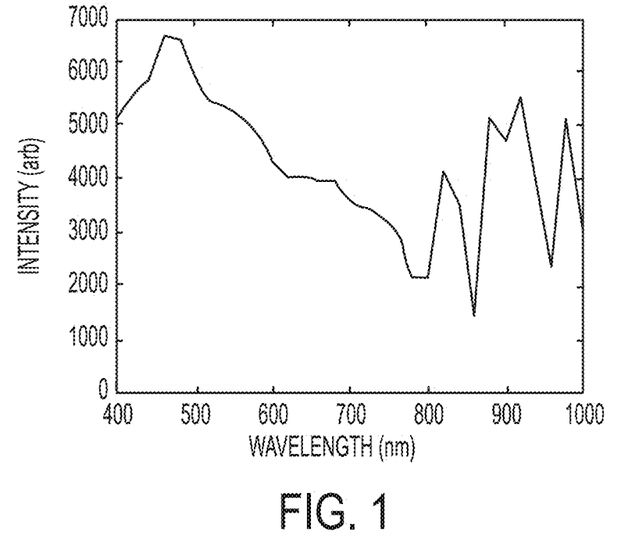
FIGS. 1 and 2 are plots showing an input spectrum and response of a hyperspectral imager to the input spectrum according to an example embodiment.
Figure 2:
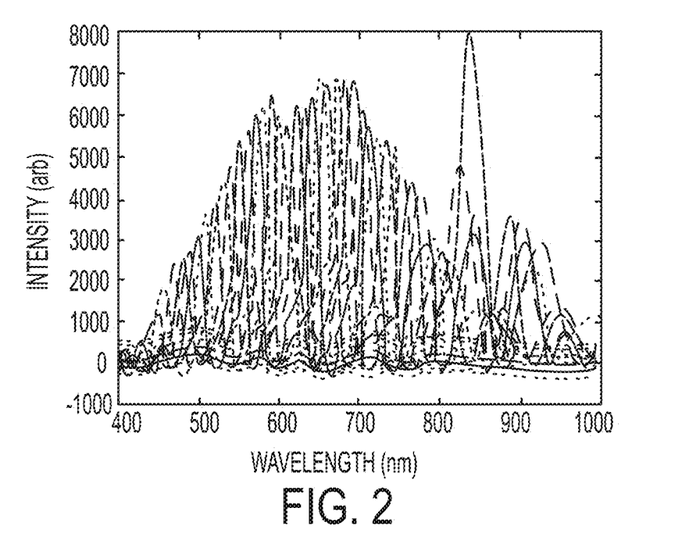

The scenario described above can be visualized by plots in FIGS. 1 and 2. FIG. 1 shows a plot of spectral power per unit wavelength emitted by a Xenon arc lamp, and FIG. 2 shows spectral sensitivity and resolution characteristics of a hyperspectral imager according to an example embodiment. To generate these figures, light from a Xenon arc lamp was sent through a monochromator into an integrating sphere with an optical power detector coupled to one of the ports. The monochromator was advanced in 10 nm steps from 400 nm to 1000 nm as the power detector recorded the optical power, in a narrow band of wavelengths centered at the monochromator wavelength, entering the integrating sphere. This power vs. wavelength curve is plotted in FIG. 1. Meanwhile, a hyperspectral imager was pointed at a second integrating sphere port to image the diffused light from the monochromator, resulting in a hyperspectral data-cube for each monochromator wavelength. A spatial average from a small area of each hyperspectral data-cube is plotted in FIG. 2; each curve represents the hyperspectral imager line shape for one monochromator wavelength, and the area under each curve corresponds to the product of the hyperspectral imager sensitivity at a given wavelength with the Xenon lamp power emitted at that wavelength as shown in FIG. 1. It can be seen that sensitivity to the blue wavelengths is much lower than sensitivity to the red wavelengths. Also, it can be seen that the sidebands of the red wavelengths that appear in the blue have similar magnitude as the peak signal in the blue, and this would significantly distort most blue signals in the presence of red signals.

The problems illustrated above can be solved by combining the hyperspectral imager with a specific kind of optical filter known as a color temperature compensation filter, which is intended to increase the apparent color temperature of a light source. These filters have an ideal characteristic for this application in that the optical transmission is high in the blue and tapers off into the red, often to pick up again in the near-infrared, which can compensate relatively lower spectral sensitivity in that spectral range as well. This characteristic, when multiplied with the spectral sensitivity of a hyperspectral imager, will flatten the overall sensitivity curve and help to increase the dynamic range across the detectable optical spectrum. In the discussion that follows, a number of factors that may decrease the blue sensitivity of Fourier transform hyperspectral imagers based on liquid-crystal polarization interferometers are detailed. In addition, mechanisms are described for compensating the uneven spectral sensitivity in order to maintain dynamic range across the spectrum.

Figure 3:
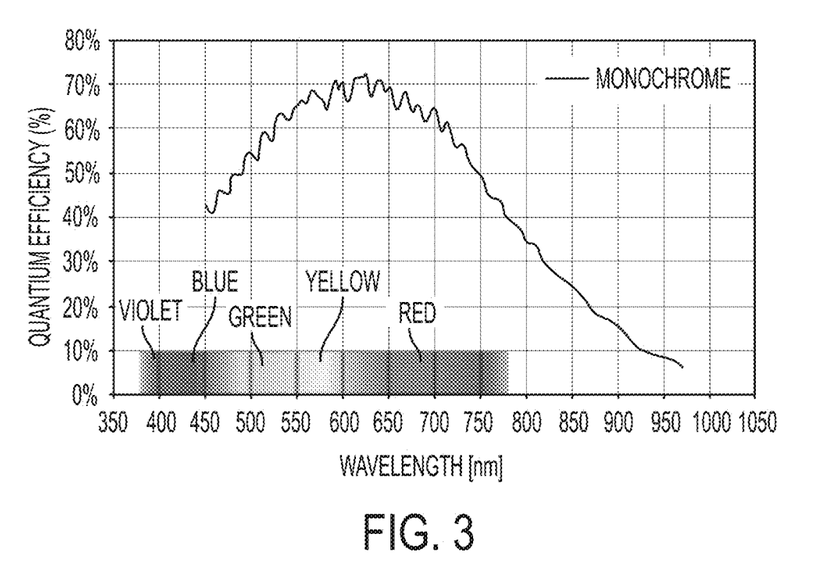
FIGS. 3 and 4 are plots showing characteristics of an image sensor according to an example embodiment.
Figure 4:
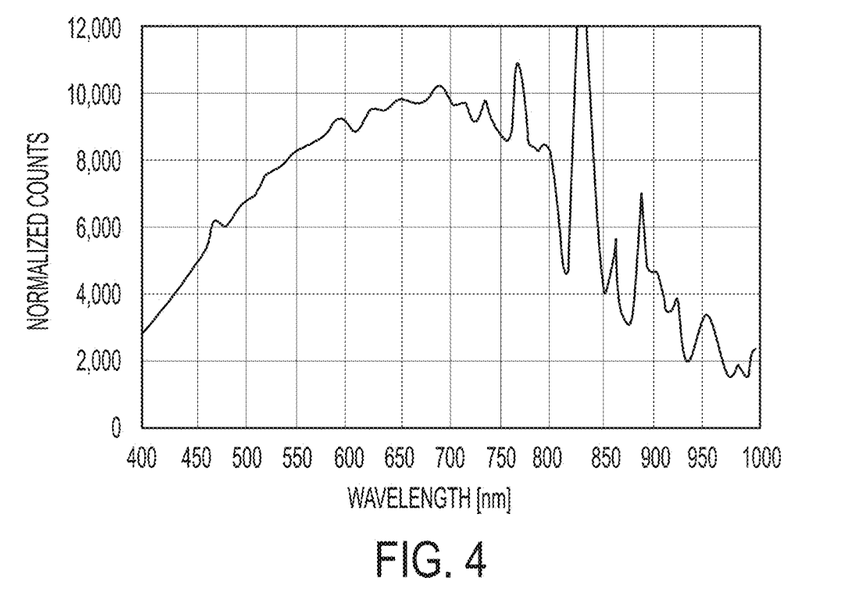

One contributor to the low blue sensitivity in some implementations is the responsivity of the image sensor, which is a function relating the photocurrent generated to the incident optical power. It takes into account both the quantum efficiency of the sensor as well as the fundamental fact that bluer (shorter wavelength) photons carry more energy per photon than redder photons; thus, less photocurrent is generated per unit of incident power at shorter wavelengths. This is depicted in the plots of FIGS. 3 and 4, which respectively show quantum efficiency and approximate responsivity of an image sensor according to an example embodiment. As seen in FIG. 4, there is an approximately three times difference in responsivity between signals at 400 nm and signals at 600 nm.

Another contributor to the low blue sensitivity in some implementations is the relationship between wavelength and spectral resolution; for the utilized interferometric technique, spectral resolution scales as wavelength squared. Therefore, for a spectrum with uniform optical power per unit wavelength, the measured energy per spectral band will scale as wavelength squared, again decreasing dynamic range across the detectable optical spectrum.

Any path delay errors present across the clear aperture of the variable optical retarder will lead to phase inhomogeneities (and loss of fringe contrast) that are more pronounced at shorter wavelengths relative to longer wavelengths. Over the wavelength ranges shown in the plots of FIGS. 1-4, this difference in fringe contrast may be 50% or more.

Figure 5:
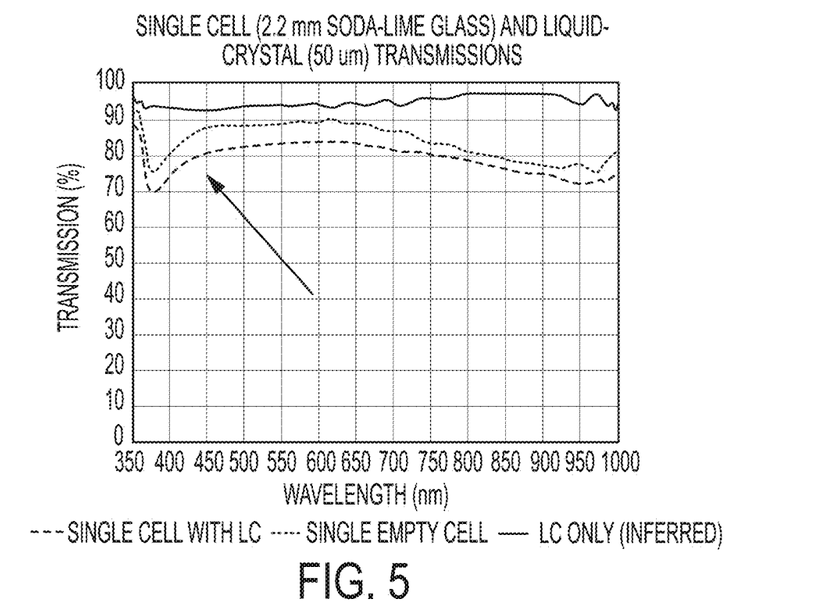
FIGS. 5, 6, 7, 8, and 9 are plots showing transmission and sensitivity characteristics of a polarization interferometer according to an example embodiment.
Figure 6:
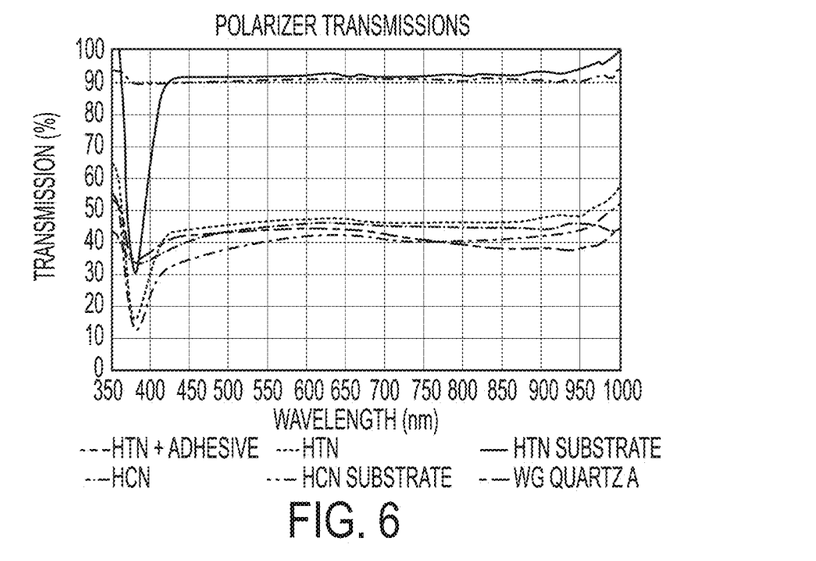

For hyperspectral imaging systems based on liquid-crystal polarization interferometers (and more generally for hyperspectral imaging systems that employ transmissive optical elements), consideration should be given to liquid-crystal cell substrate (e.g., glass) transmission and polarizer substrate transmission as well as degree of polarization afforded by the polarizers. All of these quantities decrease at shorter wavelengths as shown in FIGS. 5 and 6. The plots in FIG. 5 show optical transmission of a single liquid-crystal cell used in a polarization interferometer for a hyperspectral imager according to an example embodiment, both with and without liquid-crystal material. As this cell was constructed out of conventional soda-lime glass, there is a slight transmission dip as the transmission wavelength approaches 400 nm. This dip in transmission is compounded by the stacking of multiple liquid-crystal cells, which may be necessary to build a liquid-crystal variable retarder with sufficient maximum optical path delay. The use of borosilicate glass or fused silica substrates would help alleviate this issue. The transmission of the liquid-crystal (LC) material was inferred by comparing the transmission of an empty LC cell to the transmission of a cell filled with LC; in the case of this measurement, the LC transmission was relatively uniform. However, all the considerations regarding uniform spectral transmission for the different substrate and polarizer materials also apply to the LC material. The plot in FIG. 6 shows transmission of two polarizer substrate types and four polarizer types. Polarizer substrates and polarizer types can be chosen to have uniform (or as uniform as possible) transmission from the red to the blue or across the detectable optical spectrum.

Figure 7:
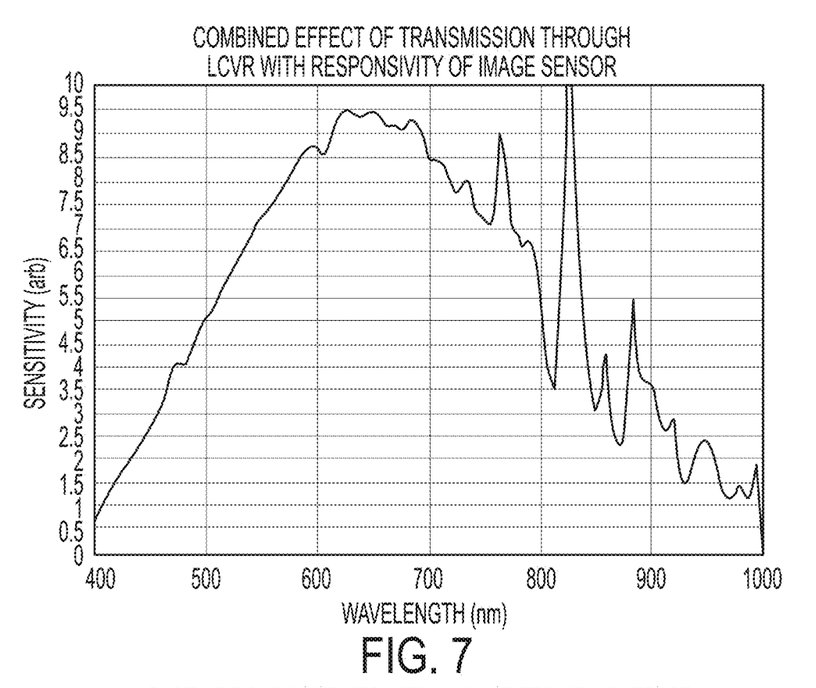

In FIGS. 7-11, various plots show the compounding effect of the different factors contributing to non-uniform sensitivity of a hyperspectral imager embodiment, and what happens when some of these factors are addressed. In FIG. 7, a plot shows the combined effect of transmission through a liquid-crystal polarization interferometer (having two filled liquid-crystal cells and two polarizers as in FIGS. 5 and 6) with the responsivity of the image sensor in FIG. 4. There is an approximately 14× higher sensitivity in the red at 600 nm than in the blue (violet) at 400 nm. The plot in FIG. 8 combines the plot from FIG. 7 with the effects of the relative change of interferogram fringe contrast at different wavelengths and the wavelength-squared dependence of spectral resolution (and thus sensitivity to a source with uniform power per unit wavelength).

Figure 8:
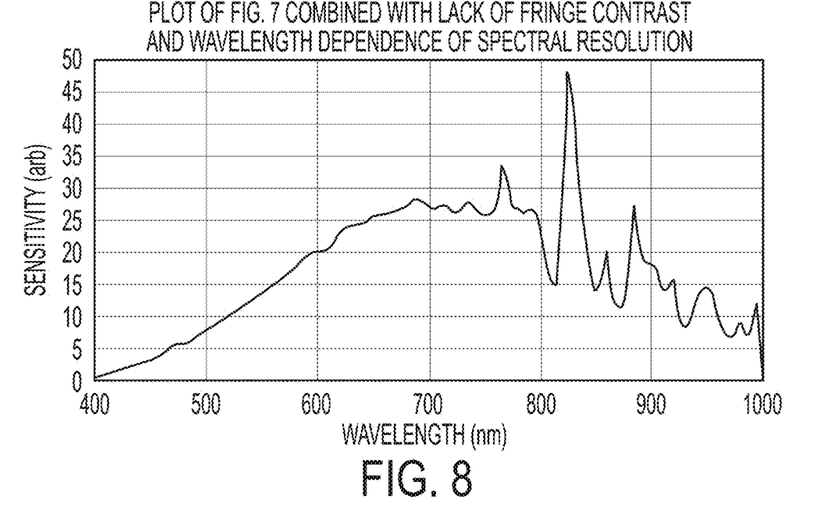
Figure 9:
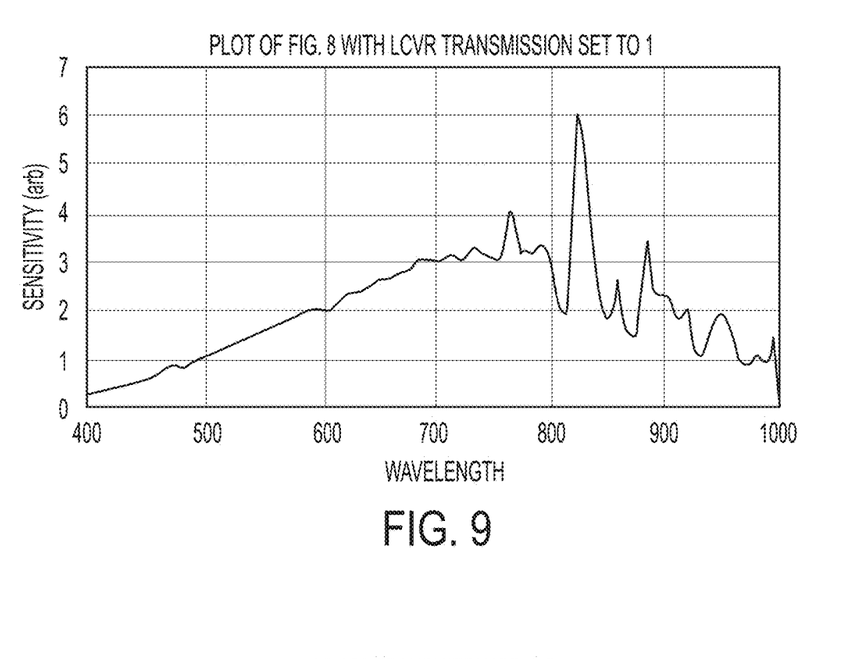
Figure 10:
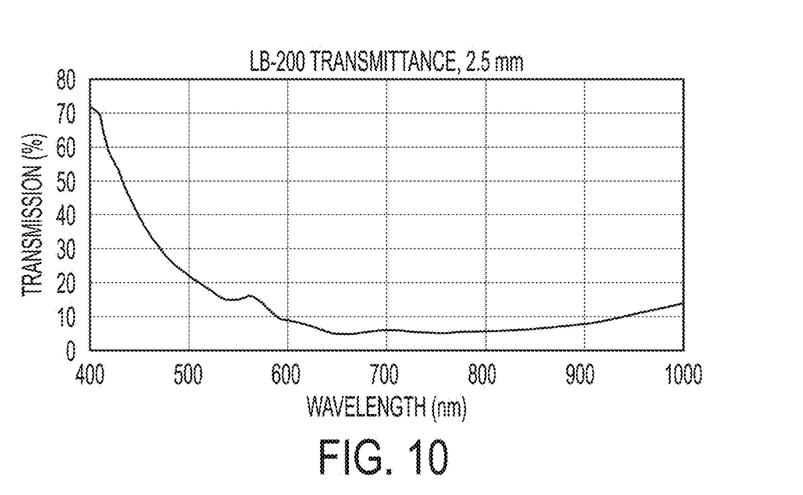
FIG. 10 is a plot showing a transmission profile of a filter according to an example embodiment.
Figure 11:
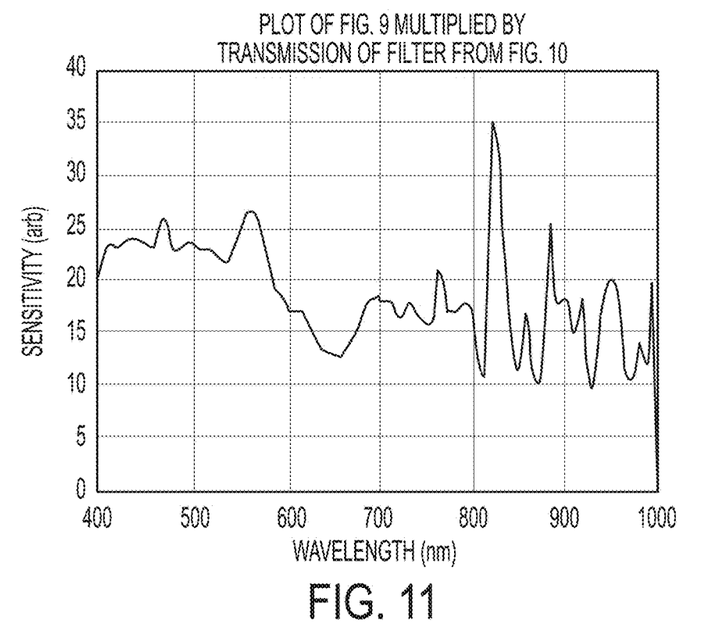
FIG. 11 is a plot showing sensitivity of a hyperspectral imager combined with a filter according to an example embodiment.

The plot in FIG. 9 takes the plot from FIG. 8 and removes the effect of the non-uniform spectral transmission of the liquid-crystal polarization interferometer. This assumes that the polarization interferometer spectral transmission can be flattened by proper choices of LC material, LC cell substrates, and polarizers. The plot in FIG. 10 is a spectral transmission profile of a color balancing filter (or color temperature shift filter) according to an example embodiment. In this case, the color balancing filter has a color temperature shift of −200 mireds; the filter comprises a 2.5 mm thick slab of LB-200 color glass, produced by Hoya® Corporation. The plot in FIG. 11 shows the hyperspectral imager sensitivity of FIG. 9 after multiplication by the transmission of the filter shown in FIG. 10.

Therefore, in order to compensate for the non-uniform spectral sensitivities described above, an apparatus (e.g., hyperspectral imager) includes one or more materials (e.g., substrate materials for polarizers and LC cells) with polarizer efficiencies and compensating filter characteristics to create a spectral response that is relatively flat with respect to wavelength, at least between the blue and the red. A preferred way to do this is to introduce in the optical path a color temperature balancing filter of the sort used to increase the apparent color temperature of incandescent (e.g., tungsten-halogen) light sources. The color temperature shift of such a filter, in "mireds", is shown in Equation (1) below, where $K_1$ is the color temperature of an incandescent source, and $K_2$ is the apparent color temperature of the source as viewed through the filter. Another way to characterize the "mireds" of a filter that would be suitable to increase the blue sensitivity relative to the red is shown in Equation (2) below, where $T_r$ is the average filter transmittance value (in %) across 610 nm, 635 nm, and 655 nm, and $T_b$ is the average filter transmittance value (in %) across 405 nm, 435 nm, and 465 nm.

$$V = \left( \frac{10^6}{K_2} - \frac{10^6}{K_1} \right) \quad (1)$$

$$V = 221(\log_{10} T_r - \log_{10} T_b) \quad (2)$$

Figure 12:
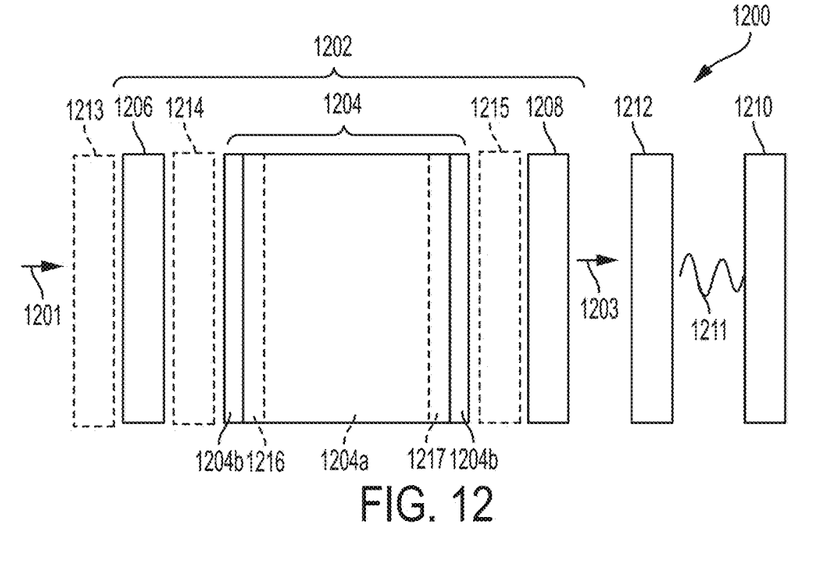
FIG. 12 is a diagram of an apparatus according to an example embodiment.

In FIG. 12, a block diagram illustrates an imaging system 1200 and apparatus according to an example embodiment. The system 1200 includes a liquid-crystal polarization interferometer 1202. The liquid-crystal polarization interferometer 1202 includes a liquid-crystal variable retarder 1204 that provides a variable retardance in response to a voltage applied across one or more liquid-crystal cells 1204a (e.g., via electrodes deposited on cell substrates 1204b; note that liquid-crystal cells 1204a can comprise additional cell substrates and electrodes not indicated in the figure). First and second polarizers 1206, 1208 are located on opposing sides of the liquid-crystal variable retarder. The liquid-crystal polarization interferometer 1202 causes an optical path delay between first and second polarizations of input light 1201. An image sensor 1210 senses interferograms 1211 that are formed from relative path delays in polarization components of the output light 1203 that have passed through the liquid-crystal polarization interferometer 1202 and that have interfered at the second polarizer 1208. The liquid-crystal cell(s) of the liquid-crystal variable retarder 1204 and either of the two polarizers 1206, 1208 may be formed of a fused silica substrate and/or a borosilicate substrate.

The system 1200 also includes a color filter 1212 that filters the light sensed by the image sensor 1210. The color filter 1212 has a spectral transmission characteristic that passes more of the light in a blue spectral region than in a red spectral region. The color filter 1212 may, for example, compensate for a decreased sensitivity of the image sensor 1210 in the blue spectral region, e.g., by increasing an apparent color temperature of input light 1201.

The color filter 1212 is shown in this example located between the liquid-crystal polarization interferometer 1202 and the image sensor 1210. The color filter 1212 could be located at other locations within the system 1200, as indicated by dashed lines 1213-1217. The color filter 1212 may include one of an absorption filter and an interference filter, and multiple filters 1212 of the same or different types may be used. The color filter(s) may have a combined color temperature shift between −20 and −400 mireds, and/or have properties that modify the wavelength dependence of the interferograms to a relative difference of 1% to 100% between red and blue wavelength bands, respectively.

Figure 13:
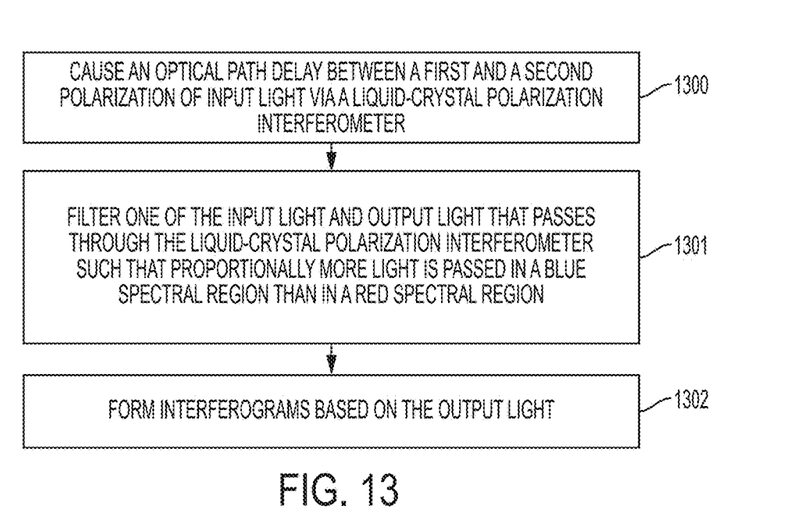
FIG. 13 is a flowchart of a method according to an example embodiment.

In FIG. 13, a flowchart shows a method according to an example embodiment. The method involves causing 1300 an optical path delay between a first and a second polarization of input light via a liquid-crystal polarization interferometer. The liquid-crystal polarization interferometer includes a liquid-crystal variable retarder that provides a variable retardance in response to a voltage applied across a liquid-crystal cell, and also includes first and second polarizers on opposing sides of the liquid-crystal cell. One of the input light and output light that passes through the liquid-crystal polarization interferometer is filtered 1301 such that proportionally more light is passed in a blue spectral region than in a red spectral region. Note that the blue light amplitude does not need to be greater (in an absolute sense) than the red light amplitude due to this filtering 1301, just that the relative amount filtered of blue is less than that of the red. Interferograms are formed 1302 based on the output light.

Figure 14:
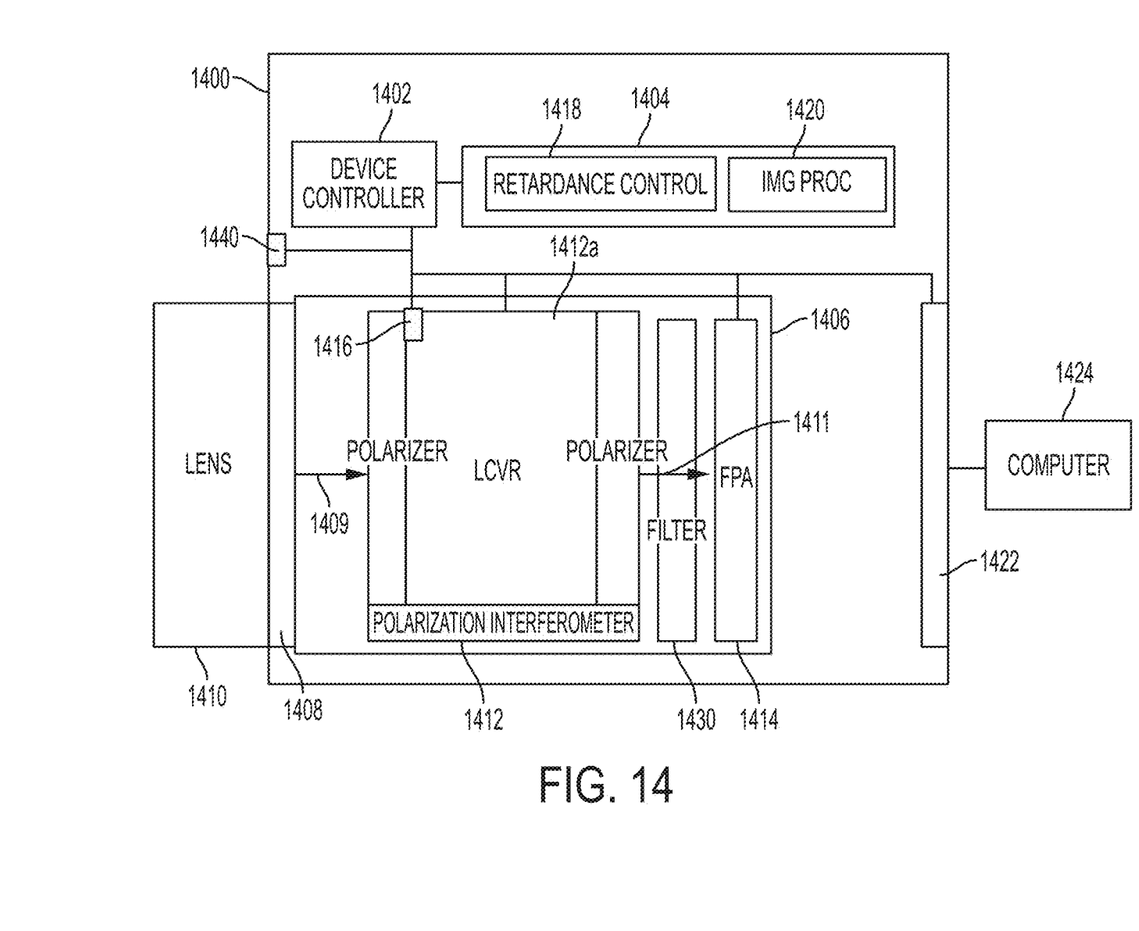
FIG. 14 is a diagram of a system and apparatus according to an example embodiment.

In FIG. 14, a block diagram illustrates an apparatus 1400 that performs image processing according to an example embodiment. The apparatus 1400 includes a device controller 1402, which may include one or more processors, such as central processing units, subprocessors, graphics processing unit, digital signal processors, etc. The controller 1402 is coupled to a memory 1404 that includes functional modules that will be described in greater detail below. The memory 1404 may include a combination of volatile and non-volatile memory, and may store instructions and data as known in the art.

The apparatus 1400 includes an optical section 1406 with an external optical interface 1408 that receives light from outside the apparatus 1400. The external optical interface 1408 may include windows, lenses, filters, apertures, etc., suitable for passing light 1409 from outside the apparatus 1400 to internal optical components. In this example, the external optical interface 1408 is shown coupled to an external lens 1410.

A polarization interferometer 1412 is located in the optical section 1406 of the apparatus 1400. The polarization interferometer 1412 is coupled to the controller 1402, e.g., via electrical signal lines. The controller 1402 applies signals to the polarization interferometer 1412 to cause a time-varying optical path delay or retardance in an LCVR 1412a that is part of the interferometer 1412. This time-varying optical path delay causes a shift between different polarizations of the light 1409, resulting in output light 1411 forming interferograms that vary as a function of the optical path delay. The interferograms are detected by an image sensor 1414 (e.g., an array of sensor pixels, focal plane array) which is also coupled to the controller 1402. The image sensor 1414 may form still images and/or video frames based on the interferograms.

A retardance controller 1418 instructs the device controller 1402 to apply a control signal to the LCVR 1412a to achieve a time-varying retardance trajectory. An image processor 1420 uses this retardance trajectory as a measure of time-varying path delay together with interferograms detected at the image sensor 1414. Each detected interferogram can be processed by calculating a transform as a function of the path delay at a corresponding position of the LCVR 1412a, and together the processed interferograms as a function of position result in spatially resolved spectral information, e.g., a hyperspectral data-cube. The hyperspectral data-cube may be presented as one or both of still images and video.

The optical section 1406 includes a color filter 1430 that filters one or more of the input light 1409 and the output light. The color filter 1430 has a spectral transmission characteristic that passes more light in a blue spectral region that in a red spectral region. The color filter 1430 compensates for, among other things, a decreased sensitivity of the image sensor in the blue spectral region. The color filter 1430 may include an absorption filter or an interference filter. The color filter 1430 increases an apparent color temperature of a source, such as having a color temperature shift between −20 and −400 mireds. The color filter 1430 may modify the spectral sensitivity of the apparatus to a relative difference of 1% to 100% between red and blue wavelength bands, respectively. In other embodiments, the color filter may be included in an external optical assembly, such as the lens 1410, through which input light 1409 passes.

Given that liquid-crystal polarization interferometers can be used in hyperspectral imaging systems as well as other apparatuses that perform spectral sensing, it may be beneficial to include in such apparatuses a source of illumination with an optical spectrum tailored to compensate for their non-uniform spectral sensitivities. For example, the apparatus 1400 may include a source of illumination 1440 that is directed external to the apparatus 1400 to illuminate external scenery. Light from the source of illumination 1440 then reflects off the external scenery, incorporating information about the reflection spectra present in the external scenery, and it enters the apparatus 1400 as input light 1409. The lens 1410 therefore images the external scenery illuminated by source 1440 onto the FPA 1414. If, as in present embodiments, the sensitivity of apparatus 1400 is lower in blue spectral ranges than it is in red spectral ranges, the source of illumination 1440 can include a higher intensity of light in blue spectral ranges than in red spectral ranges to compensate for this. Such a source of illumination 1440 can comprise multiple narrowband sources, e.g., LEDs, with individually tailored output intensities and center wavelengths. Or, it can comprise a high color temperature source, such as a xenon arc lamp. External scenery can be illuminated via a combination of light from source 1440 and ambient light. Source 1440 may be filtered with a color filter similar to filter 1430 used in the present embodiment to increase the ratio of blue light to red light.

The apparatus 1400 may be configured for a number of applications. For example, the apparatus 1400 may be configured as a mobile device (e.g., portable camera, mobile phone, tablet, wearable device) and/or an accessory for a mobile device. Generally, a mobile device may include a mobile power supply (e.g., batteries, fuel cells, solar cells) and may have a size and weight suitable for being transported by the user. The mobile device may be configured such that the controller 1402 is capable of performing image processing internally, although may still be configured to transfer unprocessed or processed data to an external computer 1424 via a data interface 1422. The data interface 1422 may include a wireless interface, e.g., WiFi, Bluetooth, etc.

The various embodiments described above may be implemented using circuitry, firmware, and/or software modules that interact to provide particular results. One of skill in the relevant arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus, comprising:
a liquid-crystal polarization interferometer that causes an optical path delay between a first and a second polarization of input light, the liquid-crystal polarization interferometer comprising:
a liquid-crystal variable retarder that provides a variable retardance in response to a voltage applied across the liquid-crystal cell; and
first and second polarizers on opposing sides of the liquid-crystal cell;
an image sensor that senses interferograms based on output light that passes through the liquid-crystal polarization interferometer; and
a color filter that filters one of the input light and the output light, the color filter having a spectral transmission characteristic that passes more light in a blue spectral region that in a red spectral region.

2. The apparatus of claim 1, wherein the color filter compensates for a decreased sensitivity of the image sensor in the blue spectral region.

3. The apparatus of claim 1, wherein the image sensor forms video frames from the interferograms.

4. The apparatus of claim 1, wherein the color filter comprises an absorption filter.

5. The apparatus of claim 1, wherein the color filter comprises an interference filter.

6. The apparatus of claim 1, wherein at least one of the liquid-crystal variable retarder, the first polarizer, and the second polarizer comprise a fused silica substrate.

7. The apparatus of claim 1, wherein at least one of the liquid-crystal variable retarder, the first polarizer, and the second polarizer comprise a borosilicate substrate.

8. The apparatus of claim 1, wherein the color filter increases an apparent color temperature of the input light.

9. The apparatus of claim 8, wherein the color filter has a color temperature shift between −20 and −400 mireds.

10. The apparatus of claim 1, wherein the color filter modifies the spectral sensitivity of the apparatus to a relative difference of 1% to 100% between red and blue wavelength bands, respectively.

11. A method comprising:
causing an optical path delay between a first and a second polarization of input light via a liquid-crystal polarization interferometer, the liquid-crystal polarization interferometer comprising a liquid-crystal variable retarder that provides a variable retardance in response to a voltage applied across a liquid-crystal cell and first and second polarizers on opposing sides of the liquid-crystal cell;
filtering one of the input light and output light that passes through the liquid-crystal polarization interferometer such that proportionally more light is passed in a blue spectral region than in a red spectral region; and
forming interferograms based on the output light.

12. The method of claim 11, wherein the filtering compensates for a decreased sensitivity of an image sensor in the blue spectral region, the image sensor sensing the interferograms.

13. The method of claim 12, further comprising forming video frames from the interferograms via the image sensor.

14. The method of claim 13, further comprising forming a hyperspectral data-cube based on the video frames.

15. The method of claim 11, wherein the filtering comprises increasing an apparent color temperature of the input light.

16. The method of claim 11, wherein the filtering comprises modifying the spectral sensitivity of an optical device that comprises the liquid-crystal polarization interferometer to a relative difference of 1% to 100% between red and blue wavelength bands, respectively.

17. A hyperspectral imaging system, comprising:
a liquid-crystal polarization interferometer that causes an optical path delay between a first and a second polarization of input light, the liquid-crystal polarization interferometer comprising:
a liquid-crystal variable retarder that provides a variable retardance in response to a voltage applied across the liquid-crystal cell; and
first and second polarizers on opposing sides of the liquid-crystal cell;
an image sensor that senses interferograms based on output light that passes through the liquid-crystal polarization interferometer, the interferograms used to create image frames;
a color filter that filters one of the input light and the output light, the color filter having a spectral transmission characteristic that passes more light in a blue spectral region that in a red spectral region; and
a controller coupled to the liquid-crystal variable retarder and the image sensor, the controller configured to control the variable retardance of the liquid-crystal variable retarder and convert the image frames to spatially resolved spectral data.

18. The hyperspectral imaging system of claim 17, wherein the color filter comprises one of an absorption filter and an interference filter.

19. The hyperspectral imaging system of claim 17, wherein the color filter has a color temperature shift between −20 and −400 mireds.

20. The hyperspectral imaging system of claim 17, wherein the color filter modifies the spectral sensitivity of the hyperspectral imaging system to a relative difference of 1% to 100% between red and blue wavelength bands, respectively.

* * * * *